W. J. SWISHER.
FROST PROOF WINDOW.
APPLICATION FILED NOV. 30, 1918.

1,317,110.

Patented Sept. 23, 1919.
2 SHEETS—SHEET 1.

Witness
J. R. Fanlin

Inventor
W. J. Swisher
By C. A. Snow & Co.
Attorneys.

W. J. SWISHER.
FROST PROOF WINDOW.
APPLICATION FILED NOV. 30, 1918.
1,317,110.
Patented Sept. 23, 1919.
2 SHEETS—SHEET 2.
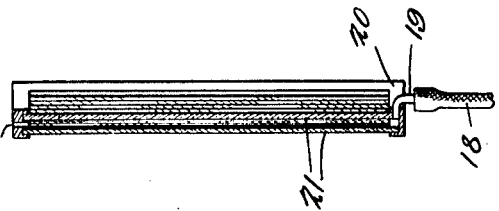
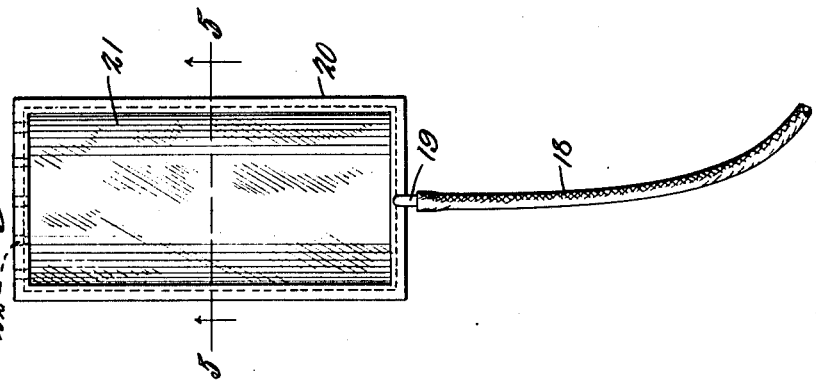
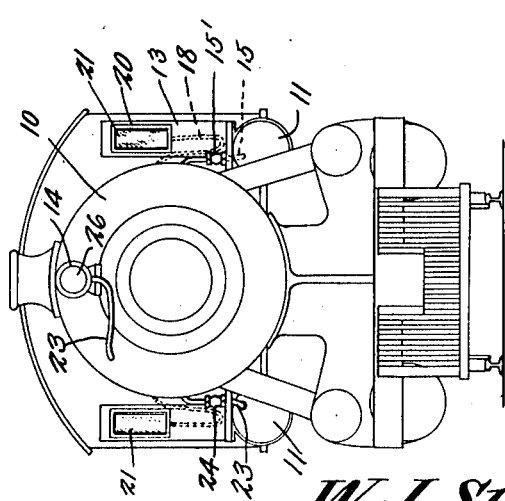
Inventor,
W. J. Swisher
By C. A. Snow & Co.
Attorneys.
Witness

UNITED STATES PATENT OFFICE.

WILLIAM J. SWISHER, OF CONWAY SPRINGS, KANSAS, ASSIGNOR OF ONE-HALF TO ALBERT DANIEL, OF TORONTO, KANSAS.

FROST-PROOF WINDOW.

1,317,110.  Specification of Letters Patent.  Patented Sept. 23, 1919.

Application filed November 30, 1918. Serial No. 264,828.

*To all whom it may concern:*

Be it known that I, WILLIAM J. SWISHER, a citizen of the United States, residing at Conway Springs, in the county of Sumner and State of Kansas, have invented a new and useful Frost-Proof Window, of which the following is a specification.

The subject of this invention is a frost-proof window intended for use on locomotives or other vehicles.

The main object of the invention is the provision of a window with means for maintaining the window pane at an even temperature to prevent accumulations of frost or moisture thereon.

Another object of the invention is the provision of means for causing snow or rain to be forced toward the edges of the window pane.

Another object of the invention is the provision of means for maintaining a constant supply of warm air in contact with the window.

The invention also contemplates generally improving the construction and enhancing the utility of frost-proof windows.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Fig. 2 is a front elevation of the same;

Fig. 3 is an enlarged, detail view in rear elevation of the window;

Fig. 4 is a central, longitudinal section of the same;

Fig. 5 is a cross section taken on the line 5—5 of Fig. 3.

Figure 1:
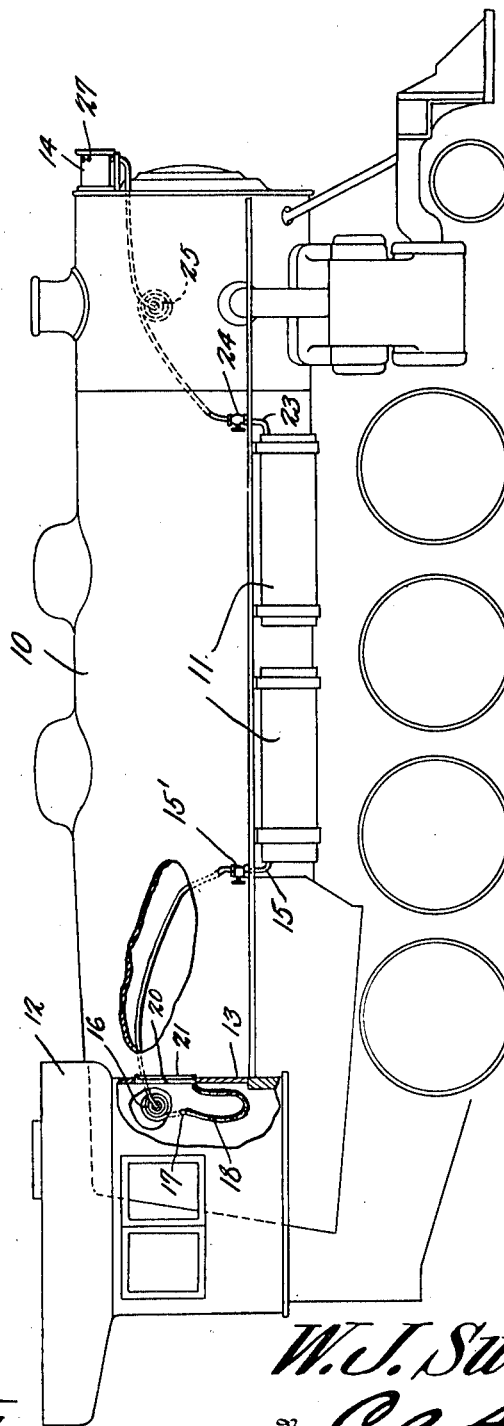
Figure 1 is a view in side elevation, parts in section, of a locomotive equipped with frost-proof windows constructed in accordance with the invention.

Referring to the drawings by numerals of reference:—

The numeral 10 indicates the boiler of the locomotive, and 11 indicates the usual air tanks or cylinders for holding a supply of compressed air by which the air brakes are operated. The cab of the locomotive is indicated by the numeral 12, and it is provided with doors 13. A headlight 14 is also supplied on the forward end of the locomotive.

Cylinders 11 are tapped to receive outlet pipes 15, only one of which is shown, and these pipes may be provided with means for regulating the flow of air therethrough, such as the globe valves 15'. The pipes 15 enter through suitable apertures within the boiler jacket, and extend, within the jacket, to a suitable position adjacent the cab 12. A coil 16 may be formed in that portion of the pipe within the boiler jacket for the purpose of providing a greater heating surface to the air passing through the pipe.

That end of the pipe 15 adjacent the cab 12 is led out through the boiler shell and into the cab, as indicated at 17, and to this protruding end is secured one end of a flexible pipe or tubing 18, the other end of which is attached to a nipple 19, secured to and protruding from the lower portion of the frame 20 of the window or sight opening of the door 13.

The frame 20 is of sufficient extent to permit the positioning therein of two spaced panes of glass 21, which are preferably curved, as shown most clearly in Figs. 4 and 5, and are positioned with their convex faces turned forwardly or outwardly.

The nipple 19 opens between the panes of glass 21 to permit the discharge of warm air into the space between the panes. The upper cross bar of the frame 20 is provided with a series of apertures or perforations 22, which are furnished for the purpose of permitting the warm air to escape from the space between the panes, and so allow a continuous circulation of warm air.

To protect the lens of the headlight 14 from moisture or frost, a similar arrangement is made use of. A tank 11 is tapped to receive an outlet pipe 23, which is provided with means for regulating the flow of air therethrough, such as the globe valve 24, and this pipe 23 enters through a suitable aperture within the boiler jacket, and extends forwardly within the jacket. A coil 25 is formed in that portion of the pipe 23 which is inclosed within the jacket, and the forward end of the pipe is led out through an aperture in the forward end of the jacket and is tapped into the headlight casing in position to direct warm air between spaced lenses, one of which is shown at 26. Apertures 27 may be provided in the headlight casing to permit the escape of air from the space between the lenses.

While the device has been herein shown and described as applied to a locomotive boiler, it is not intended to limit the invention to such use, as the invention is applicable to other vehicles or structures in which windows are used.

The operation of the invention is as follows:—

When the weather is cold or inclement, the globe valves 15' and 24 may be opened to permit air to flow from the respective cylinders 11 to the outlet pipes. This air, in passing through that portion of the pipes located within the boiler jacket, will become heated so that warm air will be discharged between the panes of glass in the windows, or the lenses of the headlight. There will be a continuous flow of this air as escape is permitted by the apertures 22 and 27.

Since the panes of glass are convex on their outer faces, the rush of air against the panes, as the locomotive is in motion, will cause the particles of snow or the drops of rain to be driven to the sides or edges of the windows, and so aid in keeping the central or sight portion clear.

Having described my invention, what I claim as new, is:—

In a locomotive window, a transversely curved frame having outlet openings at its upper end, transversely curved transparent panes mounted in the frames and disposed in spaced relation, a pipe mounted in the lower bar of the frame centrally thereof and communicating with the space between the frames adapted to supply a heated liquid therein to flow between the plates and escape through the outlet port, and means for supplying the liquid to the pipe.

In testimony that I claim the foregoing as my own, I have hereto affixed my signature in the presence of two witnesses.

WILLIAM J. SWISHER.

Witnesses:
ALBERT DANIEL,
GRACE DANIEL.